United States Patent
Bodenstab

(10) Patent No.: US 6,780,450 B2
(45) Date of Patent: Aug. 24, 2004

(54) PROCESS FOR THE PREPARATION OF MILK POWDER

(75) Inventor: Stefan Bodenstab, Mannens (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/225,723

(22) Filed: Aug. 21, 2002

(65) Prior Publication Data

US 2003/0113425 A1 Jun. 19, 2003

Related U.S. Application Data

(63) Continuation of application No. PCT/EP01/01321, filed on Feb. 8, 2001.

(30) Foreign Application Priority Data

Feb. 22, 2000 (EP) .............................. 00200616

(51) Int. Cl.⁷ ................................ A23C 9/00
(52) U.S. Cl. ................. 426/471; 159/48.1; 426/465; 426/588
(58) Field of Search ............... 426/453, 465, 426/471, 588; 159/3, 48.1

(56) References Cited

U.S. PATENT DOCUMENTS 3,621,902 A   11/1971  Okada ........................... 159/4
4,490,403 A * 12/1984  Pisecky et al. ............. 426/453
5,100,509 A *  3/1992  Pisecky et al. ............. 159/4.2
5,518,751 A    5/1996  de Boer et al. ............. 126/585

FOREIGN PATENT DOCUMENTS

EP   0873 690 A1   10/1998
GB   1 299 839     12/1972

OTHER PUBLICATIONS

English Abstract, XP–002143422, J. Pisecky et al. "Manufacture of instant dried whole milk soluble in cold water".
English Abstract, XP–002168589, Hansen et al, Tests of instant whole milk powder.
English Abstract, XP–002168590, Strakhov et al, Method for production of concentrated milk.
A.J. Baldwin et al, "Effect of pre heat treatment and storage on the properties of whole milk powder, Changes in sensory properties", Netherlands Milk and Diary Journal, NL PUDOC, Wageningen, vol. 45, No. 2, pp. 97–116 (1991).

* cited by examiner

Primary Examiner—George C. Yeung
(74) Attorney, Agent, or Firm—Winston & Strawn LLP

(57) ABSTRACT

A process for the production of a fat-containing milk powder by preparing a liquid milk, feeding the prepared liquid milk into an evaporator having at least one stage to obtain a pre-concentrate, homogenizing the pre-concentrate, further evaporating the homogenized pre-concentrate in an evaporator having at least one stage to obtain a concentrate having a total solids content of at least 50%, and then spray drying the concentrate.

16 Claims, 1 Drawing Sheet

PROCESS FOR THE PREPARATION OF MILK POWDER

CROSS-REFERENCE TO RELATED APPLICATIONS

Figure 1:
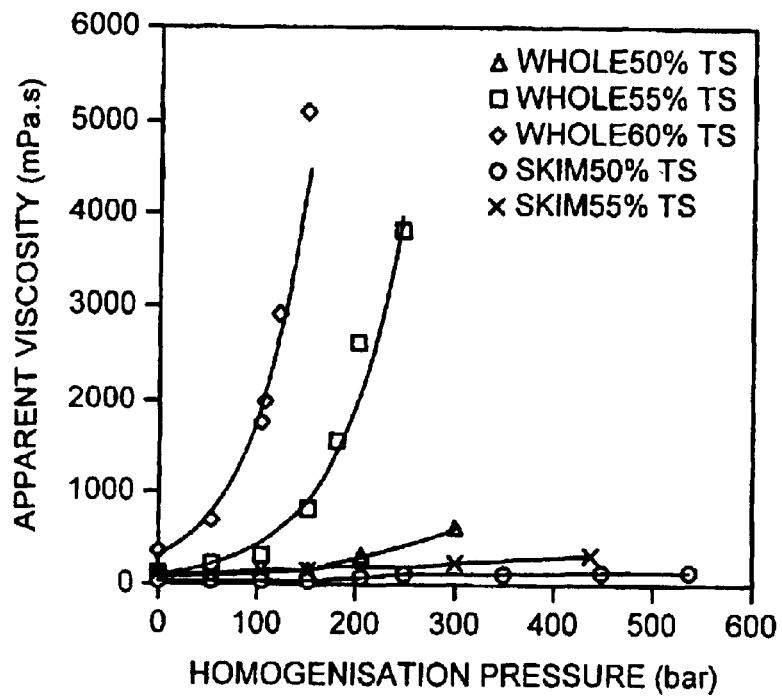

This application is a continuation of the U.S. National Stage Designation of International application PCT/EP 01/01321 Filed Feb. 8, 2001, the content of which is expressly incorporated herein by reference thereto.

TECHNICAL FIELD

The present invention relates to a process for the preparation of fat-containing milk powder.

BACKGROUND ART

In the preparation of milk powder, it is economical to concentrate production in regions where fresh milk is available in great quantities and at an economic price. It is thus desirable to increase the capacity of existing installed drying equipment, particularly spray drying towers, without investing in new equipment. A means to achieve this goal would be to introduce highly concentrated milk into the drying step. A problem is that in treating of highly concentrated milk product quality deterioration occurs as a consequence of fat clustering of the highly concentrated milk mainly during homogenization. Homogenization cannot be omitted because of the poor solubility of powders made from non-homogenized milk.

U.S. Pat. No. 5,518,751 discloses a process for the manufacture of recombined evaporated milk concentrates and milk powders by introducing a vegetable fat into the liquid concentrate in the course of evaporating for increasing the unsaturated fatty acid content thereof. In an embodiment for making milk powder, after introduction of the fat in the last effect of the evaporator, the mixture is homogenized before being dried.

EP-A-0 627 169 discloses a process for the manufacture of liquid evaporated milk in which the preheating and evaporation steps are within the evaporation equipment and homogenization takes place before concentration.

EP-A-0 873 690 discloses a process of preparing a fat-containing foodstuff comprising adding a fat phase to an aqueous phase said adding and homogenizing being located between two evaporators of a plurality of evaporator effects. The purpose of this step is to protect heat-sensitive oils. For instant milk powder it would not make sense to separate the fat from the production milk prior to evaporation.

Thus, there remains a need for an improved process for preparing a fat containing mild powder.

SUMMARY OF THE INVENTION

We have found that it is possible to drastically increase productivity of manufacture of milk powder by primary spray drying fresh milk and by the way to maintain or even improve the powder quality in that homogenization is carried out at mid way of evaporation, i.e., on the pre-concentrate between the stages of the multiple stages evaporator. This positioning of homogenization in the present invention is a solution to the problem of too high viscosity obtained in a concentrate homogenization. Thus the control of viscosity allows drying of the concentrate to a solids content of 50% by weight or greater without adversely affecting the quality of the powder obtained after drying.

The process of the invention thus comprises preparing a standardized milk, feeding the prepared standardized milk into an evaporator having at least one stage to obtain a pre-concentrate, homogenizing the pre-concentrate, further evaporating the pre-concentrate in an evaporator having at least one stage to obtain a concentrate having a total solids content of at least 50% by weight, and then spray drying the concentrate.

Preferably, the pre-concentrate is homogenized in two stages, with the preconcentrate is homogenized in a first stage at a pressure of from about 50 to about 250 bar and then in a second stage at a pressure of up to 150 bar. Also, the milk concentrate can be spray dried using high pressure swirl nozzles, at a pressure of about 140 bar.

The resulting spray dried milk can be agglomerated and instantized by lecithination, after-dried, after-cooled, filled into packs and gassed. Preferably, the liquid milk is recombined from milk powder, skim milk powder, butter oil or vegetable oils along with an appropriate amount of water.

BRIEF DESCRIPTION OF THE DRAWING FIGURES

The following drawings where parts and percentages are by weight illustrate the invention.

Figure 2:
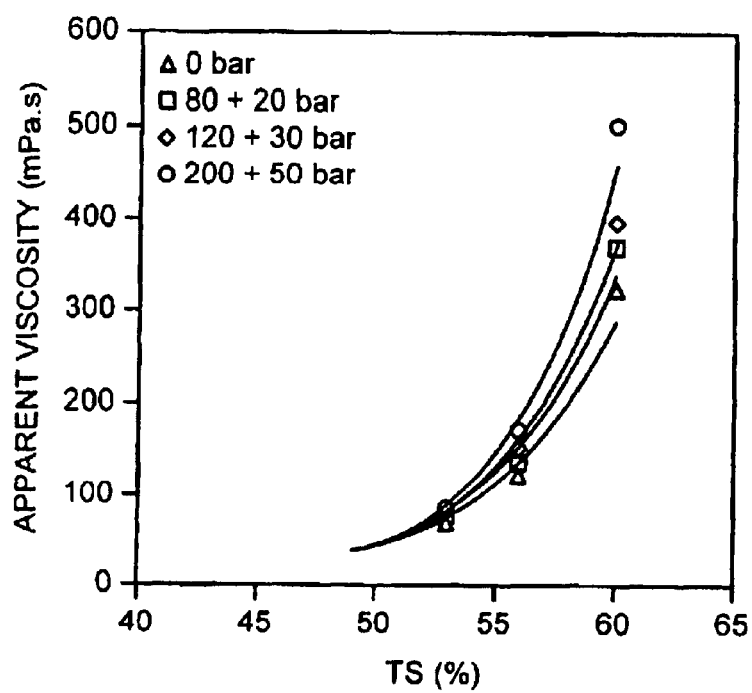

FIG. 1 gives the state of apparent dynamic viscosity (mPa.s) plotted against homogenization pressure (bar) at different solid concentrations (whole 50, 55 and 60% by weight total solids, TS) for the homogenization of milk concentrate at 28% fat in solid matter after evaporation and serves as a reference and skim milk at 50 and 55% TS for comparison and FIG. 2 gives the state of apparent dynamic viscosity (mPa.s) plotted against solids concentration (%) under different homogenization conditions (without homogenization and at 80+20, 120+30 and 200+50 bar) for the homogenization of milk preconcentrate at 28% fat in solid matter at mid-way the concentration according to the invention.

DETAILED DESCRIPTION OF THE PREFERRED EMBODIMENTS

The principle behind this invention is the ability to spray dry a milk concentrate containing up to about 63% by weight solids concentration.

According to the invention, fresh whole milk is standardized to a desired fat to solids non-fat ratio. This standardization is carried out generally by adding the appropriate amount of skimmed milk to the fresh whole milk. This can also be done by composing suitable milk liquids from fresh whole milk, partially skimmed milk, cream, butterfat, buttermilk etc. Recombination of milk can also be carried out from milk powder, skim milk powder, butter oil or vegetable oils with the appropriate amount of water.

Depending on the quality of milk, the thus standardized milk is then optionally clarified by centrifugation, preferably after having been heated to about 40° C. to about 45° C. in order to obtain the best separation and cleaning efficiency during clarifying.

The milk is then subjected to heat treatment. The heat treatment can be performed in two steps as is conventional, by preheating and then heating with a suitable dwell time.

The heat-treated milk is then fed into an evaporator. When the total, solids content of the milk is from 20 to 50% by weight, preferably about 35% by weight, the milk is homogenized, in one or two stages, preferably in two stages before the evaporation process is completed.

When the total solids content of milk is greater than about 50% by weight, the particles, in particular casein micelles and fat droplets, become sensitive to mechanical shear stress. Homogenizing the milk at about 35% by weight solids allows efficient homogenization using high pressure piston homogenizers. Homogenization can be carried out on part of the total flow. It is important in this case that the fat part of the milk is completely homogenized together with an appropriate part of the non-fat solids and water.

In principal, the milk can be homogenized at any concentration below a critical concentration which is about 50% by weight. On industrial manufacturing level, it is desirable to homogenize at a concentration as high as possible because this reduces the overall size of the homogenizer and hence manufacturing cost. Consequently, it is preferred to homogenize mid-way of the evaporator. The specific evaporator configuration will indicate the best solid content (TS, total solids) where the homogenization is practiced.

Homogenization can be carried out in one or two stages. The pressure of the first stage of the homogenizer is from about 50 to about 250 bar. Preferably, the pressure is from about 140 bar to about 150 bar. The pressure of the second stage of the homogenizer is from 0 to about 150 bar. Preferably, the pressure is from about 20 to about 60 bar. The total pressure of the homogenizer is from about 140 bar to about 250 bar. Preferably the total pressure of the homogenizer is from about 160 bar to about 210 bar.

Surprisingly, homogenizing the milk pre-concentrate at this intermediate concentration level avoids the strong viscosity increase which occurs if one homogenizes the milk at solids concentration above 50% by weight and allows for later spray drying at a total solids content of preferably about 55% up to about 60% by weight. Spray drying at such a high total solids content was previously impossible because the structure of the concentrate is destroyed during homogenization. For example the viscosity of a 60% solids by weight milk concentrate is approximately one order of magnitude (10×) higher when the milk is homogenized at 60% concentration by weight compared to the viscosity with homogenization about mid-way the evaporation.

In the figures, in-line milk viscosity measurements were carried out as follows:

1. Basic Principle

In laminar flows (with a Reynolds number less than approximately 2100), the application of either Newton's second law, Navier Stokes equations, the energy equation or dimensional analysis, to an incompressible fluid flowing in a circular pipe of length l and radius r centered on the axis of the pipe of diameter D, allows to define the Hagen-Poiseuille equation (Munson et al, Fundamentals of Fluid Mechanics, John Wiley & Sons, 1990) which links the apparent viscosity ($\eta$, Pa.s) to the pressure drop ($\Delta P$, Pa):

$$\eta = \frac{\pi \cdot \Delta P \cdot D^4}{128 \cdot Q \cdot l}$$

where Q is the flow rate ($m^3 \cdot s^{-1}$), D is the pipe diameter and l is the pipe length (m). Since the results were restricted to laminar flows of Newtonian fluids (with Re numbers<approximately 2100), they were not considered as absolute values, but relative ones and used in a comparative way.

2. Experimental

Depending on experimental conditions two pipe modules, containing several pipe sections of various lengths and thermally regulated (50+/−3° C.) by a water circulation, were used. These modules were installed after the evaporation unit and their characteristics are given in Table 1 below:

TABLE 1

| Module | Pipe diameter (m) | Pipe length (m) | | | | |
|---|---|---|---|---|---|---|
| | | Section 1 | Section 2 | Section 3 | Section 4 | Section 5 |
| 1 | 0.0100 | 23.30 | 12.41 | 8.66 | 4.71 | — |
| 2 | 0.0103 | 2.19 | 2.38 | 2.38 | 2.38 | 1.38 |

DP & Q values were collected during running periods of 10 min and then averaged. Viscosity was deduced from previous equation.

As shown in FIG. 1, the homogenization of concentrated whole milk (28% fat in solid matter) with solids concentration above 50% by weight (TS) leads to strong increase in its apparent dynamic viscosities, which is not the case for skim milk.

In FIG. 2, the homogenization of milk (28% fat in solid matter) mid way the concentration results in moderate viscosities after finishing the concentration to solids concentrations above 50% by weight and the effect of homogenization pressures is moderate.

After homogenization, the milk concentrate is once again fed into the evaporator where it is finally concentrated.

Once evaporation is complete, spray drying of the milk concentrate can be carried out preferably with high pressure swirl nozzles which are disposed to the hot air flow in the drying tower. The atomization pressure is of about 80 to about 250 bar, preferably of about 140 to about 150 bar. Preferably, the atomization temperature of the concentrate is about 72° C.

In order to instantize the powder, lecithination with agglomeration of the recirculated fines can be carried out in the dryer, or lecithination can be carried out separately from the drying tower in an after-drryer, e.g., in a fluidized bed.

The processing of the milk powder after the atomization step comprising after-drying, after-cooling, storage, filling into cans or boxes and gassing is then completed according to the standard known to experts in the field.

EXAMPLES

Embodiments of the invention are now described by way of example only. In the following Examples, parts and percentages are by weight unless otherwise stated.

Example 1

4255 kg of untreated whole milk containing 4.08% fat and 8.55% non-fat milk solids and 711 kg skimmed milk containing 0.1% fat and 8.9% non-fat solids were mixed in a tank to form 4966 kg of standardized milk with 3.5% fat and 8.6% non-fat solids.

The mixture was passed by a centrifugal pump through a plate-type heat exchanger in which it was preheated to 40–45° C. and it was then clarified in a centrifugal separator. The clarified mixture was pasteurized, first by indirect heating in a plate heat exchanger at maximum 85° C. with a holding time of 50 s or less at that temperature, and subsequently by direct steam injection at minimum 105° C. with a holding time of minimum 5 s.

The pasteurized liquid was then fed to the first effects of a multiple effect falling film evaporator to obtain a preconcentrate with a solid content of 35%. The temperature of milk vapor in the exhaust duct of the separator of the first effect was up to 72° C.

After heating the preconcentrate to 60–75° C. in a plate heat exchanger, it was then passed through an homogenizer in which it was homogenized in two stages, first under a pressure of 120 bar and then under a pressure of 30 bar.

The homogenized mixture was then delivered with a pump to the last effects of the falling-film evaporator in which it was finally concentrated to a dry matter content of 55%. It was then taken up by a high pressure pump and spray dried in a drying tower by high pressure swirl nozzles at a pressure of 140 bar and a temperature of 72° C. It was agglomerated and lecithinated to achieve instantization, after-dried, after-cooled, filled into packs and gassed. The powder had excellent reconstitution and physico-chemical characteristics. When compared to a conventional whole milk powder produced from a concentrate from the evaporator of 49% solids content the powder structure was coarser with less fines of dimension of less than 100 microns.

In the following Table 2, the consumer perceivable reconstitution properties of the powder of Example 1 (55% TS of the concentrate after evaporation) are given in comparison to a reference (50–51% TS of the concentrate after evaporation) using different tests. The tests were carried out as follows:

Wet: This is a test to evaluate the wettability of milk powders by measuring the sinkability time (in s.) of the powder into water at 20° C. (Wett 20) and at 40° C. (Wett 40), according to IDF-Standard 87:1979.

Misc: Also called sludge test, estimates the miscibility of milk powders by visual evaluation of the amount of undissolved milk powder (lumps) after powder reconstitution at 20° C. (Misc 20) and at 40° C. (Misc 40), and the suspension is poured through a preweighed screen which is reweighed after draining and removing of any liquid residues (J. Pisecky, Handbook of Milk Powder Manufacture, Niro A/S DK-2860 Soeborg, Denmark). The results are expressed in scale value from 0 (best) to 5.

SOD: State of dissolution, also called slowly dispersible particles (SDP) test determines the amount of undissolved small particles in the milk after reconstitution of milk powders. This test is conducted simultaneously with sludge determination (Misc above) using the liquid from the screen filtration and comparing the film on the wall of a test tube with that of the test index standard photo. SOD 20 and SOD 40 respectively mean that the test is carried out at 20° C. and 40° C., respectively. The results are expressed in scale value from 0 (best) to 5.

W.S.: White specks test, also called White flecks number (IDF standards 174:1995, J. Pisecky, Handbook of Milk Powder Manufacture, Niro A/S DK-2860 Soeborg, Denmark), is for the estimation of the white flecks, i.e. tiny flakes floating in the reconstituted solution. After being allowed to stand for several min., the flakes rise to the surface forming a thin layer and are visually detected. The results are expressed in scale value from 0 (best) to 5.

TABLE 2

Reconstitution Properties of 30 days old powders sampled of the filler

| After hours | Wett 20 (s) | Wett 40 (s) | Misc 20 (scale 0–5) | Misc 40 (scale 0–5) | SOD 20 (scale 0–5) | SOD 40 (scale 0–5) | W.S. (scale 0–5) |
|---|---|---|---|---|---|---|---|
| Example 1 | | | | | | | |
| 1 | 26 | 20 | 1.5 | 0.5 | 2.5 | 1 | 1 |
| 4 | 39 | 58 | 2 | 0.5 | 2.5 | 0.5 | 1 |
| 8 | 33 | 22 | 2.5 | 1 | 2.5 | 1.5 | 1.5 |
| 12 | 58 | 120 | 1.5 | 1 | 2.5 | 1.5 | 1.5 |
| 16 | 44 | 21 | 0.5 | 1.5 | 2 | 1 | 1 |
| 20 | 36 | 41 | 1.5 | 1 | 2.5 | 1.5 | 1.5 |
| 22 | 35 | 19 | 1 | 0.5 | 2.5 | 1 | 1.5 |
| Average | 39 | 43 | 1.5 | 0.9 | 2.4 | 1.1 | 1.3 |
| Reference | | | | | | | |
| 1 | 116 | 18 | 1.5 | 2 | 2 | 1 | 1 |
| 8 | 120 | 17 | 3 | 1.5 | 2.5 | 1.5 | 1.5 |
| 16 | 71 | 17 | 3 | 2 | 2.5 | 1 | 1 |
| 24 | 35 | 16 | 1 | 1 | 2.5 | 1 | 0.5 |
| 32 | 70 | 15 | 2.5 | 1.5 | 2.5 | 1 | 0.5 |
| Average | 86 | 17 | 2.1 | 1.6 | 2.4 | 1.1 | 1.0 |

As shown in Table 2 above, the consumer perceived properties of the reconstituted milk powder of the process of the invention were similar or even better than those of the reference.

In following Table 3, further characteristics of the powder of the process of the invention are given in comparison to the reference (50–51% TS of the concentrate after evaporation) using different tests. The tests were carried out as follows:

Free Fat: The free fat levels in instant milk powder are determined by cold extraction of the powder with hexane at 20° C. slowly poured over a filtration set-up containing the powder, connected to a water-jet vacuum pump, so that the solvent passes through the filter by gravity. The filtrate is concentrated to dryness and the free fat weighed. The results are expressed as weight % free fat in the powder.

Homogenization degree and Sediment: The homogenization (homo) degree is calculated from the fat content before and after centrifugation of a solution with a dry matter content of 13% by weight, expressed as weight % (F. Kiermeier et al, "Milch und Milcherzeugnisse, Verlag" Paul Parey, Berlin, 314 (1973)). The sediment of reconstituted milk powder is measured by the gravimetric determination of the deposit after centrifugation, expressed as weight % of the powder.

Viscosity: The viscosity of the reconstituted powder is determined by means of the Haake RS 100/Plate-cone/35 mm/4° viscometer at a shear rate of 100 $s^{-1}$ at 25° C. and expressed in mPa.s.

TABLE 3

Free fat, homogenization degree and sediment of powders sampled of the filler

| After hours | Free Fat (g/100 g) | Homo Degree (g/100 g) | Sediment (g/100 g) | Viscosity of Reconstituted Powder (mPa · s) |
|---|---|---|---|---|
| Example 1 | | | | |
| 1 | 1.65 | 80.3 | 0.28 | 124 |
| 4 | 1.77 | 78.9 | 0.33 | 130 |
| 8 | 1.59 | 81.4 | 0.32 | 169 |
| 12 | 1.56 | 81.9 | 0.34 | 122 |
| 16 | 1.52 | 82.6 | 0.28 | 144 |

TABLE 3-continued

Free fat, homogenization degree and sediment of powders sampled of the filler

| After hours | Free Fat (g/100 g) | Homo Degree (g/100 g) | Sediment (g/100 g) | Viscosity of Reconstituted Powder (mPa · s) |
|---|---|---|---|---|
| 20 | 1.54 | 82.0 | 0.28 | 119 |
| 22 | 1.56 | 81.4 | 0.27 | 112 |
| Average Reference | 1.60 | 81.2 | 0.30 | 131 |
| 1 | 1.54 | 85.2 | 0.26 | 111 |
| 8 | 1.70 | 88.0 | 0.28 | 119 |
| 16 | 1.45 | 88.9 | 0.31 | 115 |
| 24 | 1.46 | 88.9 | 0.25 | 118 |
| 32 | 1.39 | 89.5 | 0.28 | 116 |
| Average | 1.51 | 88.1 | 0.28 | 116 |

As shown in Table 3 above, the further characteristics of the powder of the process of the invention are similar to those of the reference.

Example 2

The method of Example 1 was carried out with the difference that the intermediate homogenization, i.e., the homogenization of the preconcentrate had a pressure of the first stage of 150 bar and a pressure of the second stage of 30 bar.

The quality of the powder was comparable to that obtained in Example 1.

What is claimed is:

1. A process for the production of a fat-containing milk powder, the process comprising:

preparing a standardized milk, feeding the prepared standardized milk into an evaporator having at least one stage to obtain a pre-concentrate containing fat and non-fat solids at a concentration that is below about 50% by weight, homogenizing the pre-concentrate, further evaporating the pre-concentrate without separating fat therefrom in an evaporator having at least one stage to obtain a concentrate having a total solids content of at least 50% by weight, and then spray drying the concentrate to form the powder.

2. The process of claim 1, wherein the pre-concentrate is homogenized at a total solids content of 20 to 50% by weight.

3. The process of claim 1, wherein after further evaporation the pre-concentrate has a total solids content of 55 to 60% by weight.

4. The process of claim 1, wherein the pre-concentrate is homogenized in two stages.

5. The process of claim 4, wherein the preconcentrate is homogenized in a first stage at a pressure of from about 50 to about 250 bar and then in a second stage at a pressure of up to 150 bar.

6. The process of claim 4, wherein the preconcentrate is homogenized in a first stage at a pressure of from about 140 bar to about 150 bar and then in a second stage at a pressure of from about 20 to about 60 bar.

7. The process of claim 1, wherein the preconcentrate is homogenized at a total pressure of from about 140 bar to about 250 bar.

8. The process of claim 1, wherein the preconcentrate is homogenized at a total pressure of from about 160 bar to about 210 bar.

9. The process of claim 1, in which the milk concentrate is spray dried using high pressure nozzles.

10. The process of claim 9, wherein the milk concentrate is spray dried using high pressure swirl nozzles.

11. The process of claim 9, wherein the milk concentrate is spray dried at a pressure of about 140 bar.

12. The process of claim 1, wherein the powder is agglomerated and instantized by lecithination, after-dried, after-cooled, filled into packs and gassed.

13. The process of claim 1, wherein the standardized milk is recombined from milk powder, skim milk powder, butter oil or vegetable oils along with an appropriate amount of water.

14. A process for the production of a fat-containing milk powder, the process comprising:

preparing a standardized milk, feeding the prepared standardized milk into an evaporator having at least one stage to obtain a pre-concentrate containing fat and non-fat solids at a concentration that is below about 50% by weight, homogenizing the pre-concentrate without separating fat therefrom at a total solids content of 20 to 50% by weight in two stages including a first stage at a pressure of from about 50 to about 250 bar and a second stage at a pressure of up to 150 bar, further evaporating the pre-concentrate in an evaporator having at least one stage to obtain a concentrate having a total solids content of at least 50% by weight, and then spray drying the concentrate using high pressure nozzles to form the powder.

15. The process of claim 14, wherein the powder is agglomerated and instantized by lecithination, after-dried, after-cooled, filled into packs and gassed.

16. The process of claim 15, wherein the standardized milk is recombined from milk powder, skim milk powder, butter oil or vegetable oils along with an appropriate amount of water.

* * * * *